US012755039B2

(12) United States Patent
Sne et al.

(10) Patent No.: US 12,755,039 B2
(45) Date of Patent: Oct. 6, 2026

(54) OBJECT SECURITY CONTROL

(71) Applicant: Varonis Systems Inc., Miami, FL (US)

(72) Inventors: Ron Sne, Atlit (IL); Amir Belgi, Ra'anana (IL); John Eugene Neystadt, Kfar-Saba (IL); Orr Kadec, Haworth, NJ (US)

(73) Assignee: Varonis Systems Inc., Miami, FL (US)

( * ) Notice: Subject to any disclaimer, the term of this patent is extended or adjusted under 35 U.S.C. 154(b) by 205 days.

(21) Appl. No.: 18/494,631

(22) Filed: Oct. 25, 2023

(65) Prior Publication Data

US 2025/0139263 A1 May 1, 2025

(51) Int. Cl.
*G06F 21/62* (2013.01)
*G06F 21/60* (2013.01)
*G06F 40/216* (2020.01)

(52) U.S. Cl.
CPC ........ *G06F 21/6209* (2013.01); *G06F 21/604* (2013.01); *G06F 40/216* (2020.01)

(58) Field of Classification Search
CPC ... G06F 21/6209; G06F 21/604; G06F 40/216
See application file for complete search history.

(56) References Cited

U.S. PATENT DOCUMENTS

2002/0031230 A1* 3/2002 Sweet ................. H04L 63/0428 380/278
2019/0122272 A1* 4/2019 Koren ................. G06F 16/3344
2022/0224685 A1* 7/2022 Dhindsa ............... G06Q 20/382
2022/0303322 A1* 9/2022 Rangarajan ......... H04L 65/4025
2022/0365860 A1* 11/2022 Silverstein .......... G06F 11/3466
2024/0054240 A1* 2/2024 Ezra ....................... G06F 21/604
2024/0135009 A1* 4/2024 Doyle ................... H04L 63/108
2024/0346255 A1* 10/2024 Blohm .................... G06F 40/30

* cited by examiner

*Primary Examiner* — Vance M Little
(74) *Attorney, Agent, or Firm* — Thorpe North & Western, LLP.

(57) ABSTRACT

A system for managing access to objects in a computing system. The system includes processes to allow users to request access to objects, and the automated review of such requests. The system is configured to consider a wide range of factors, including the content of the request and the object requested, information relating to the user, and metadata relating to the document, as well as user behaviours. Natural language analysis is utilised to analyse a user's request for access and the object to which access is requested.

18 Claims, 5 Drawing Sheets

OBJECT SECURITY CONTROL

TECHNICAL FIELD

The following disclosure relates to a system for controlling access to files within a computing system, and in particular to controlling file access rights for users.

BACKGROUND

Large numbers of files are stored in computing systems by organizations to which various people in the organization need access to perform their roles. However, different files have widely varying security provisions which define who should be allowed to access them and what rights they have in relation to them. It is important that computing systems accurately enforce such security provisions and also provide an efficient and reliable method to modify user rights.

The word "file" is used herein to refer to any accessible data structure in a computer system such as documents, emails etc, but this disclosure is principally directed to files constituting written documents. The principles disclosed herein apply to any type of file.

Due to the large quantity of files which are stored and the large number of users, processes which rely on significant human involvement may not be practical. For example, expecting a user to approve or deny each request for access would consume significant quantities of time and likely lead to errors. This often leads to access being freely granted to a large portion of stored files, with access restrictions only being applied to a minimum set of files which can lead to excessively broad access. Furthermore, many parameters relating to files and users which may be useful in determining whether access should be allowed are very difficult, or impossible, for users to access and interpret in an efficient and meaningful way. Systems which rely on human involvement are therefore limited in the parameters they can consider when defining access provisions.

Existing systems to providing file security control relying on human intervention are therefore inefficient, while existing automated, computer-based, systems which seek to address the limitations of human involvement are often too simplistic and are limited in the complexity of the systems they provide.

There is therefore a need for file security control system which avoids the limitations of previous systems.

SUMMARY

The invention is defined by the following disclosure and the claims.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION

The present disclosure relates to file security control systems for controlling users' access to files stored in a computing system.

Figure 1:
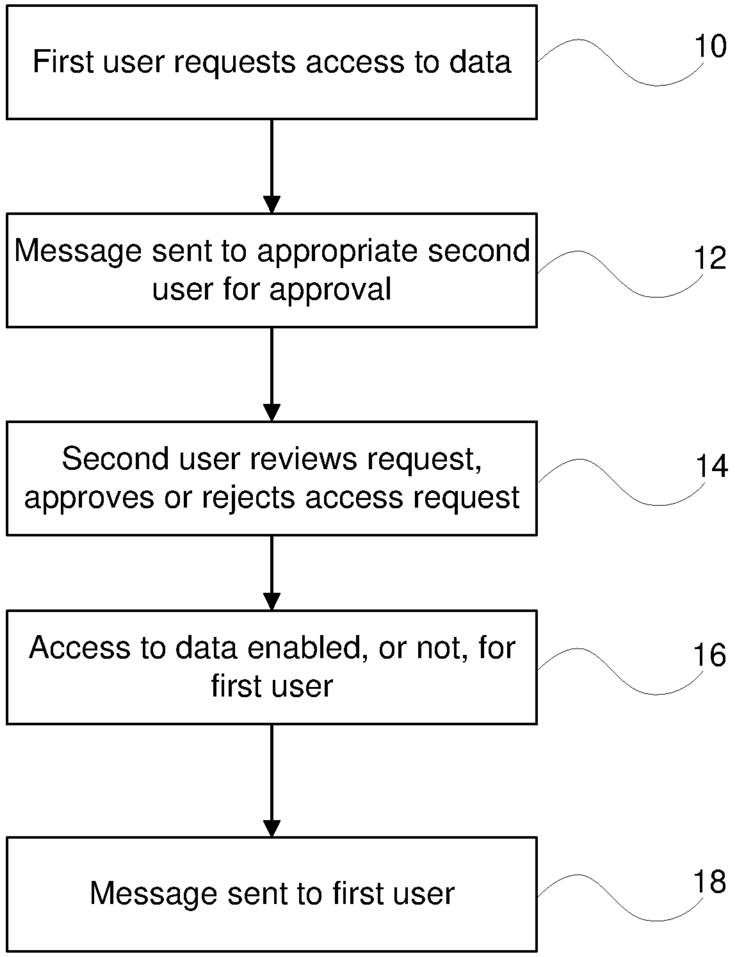
FIG. 1 shows a flow chart of an access control method using human review.

FIG. 1 shows an exemplary method of a previous system for controlling file security.

At step 10 a user identifies files to which they require access (for example a document), and enters a request into the relevant security control system. The request could arise because the user tries to access files to which they do not currently have access, or due to a pro-active request by the user for access to one or more files they know they are going to need. At step 12 the security control system identifies the relevant second user who is authorised to approve access to the files and a message is sent to that second user requesting they approve, or not, the access request. The message may be sent by any appropriate means, for example email or within an application.

At step 14 the second user reviews the request against the relevant criteria and approves or rejects the request. Both by limitations of access and time the second user's review is limited to information to which they have access and based on a limited subset of parameters to be able to conduct the review in a reasonable period.

At step 16 the security control system updates access privileges in accordance with the second user's instruction, and may also transmit a message to the first user at step 16 to inform the first user of the outcome.

The thoroughness and accuracy of this process is limited by the ability and availability of the second user to conduct step 14, but also by the data and information to which they have access and are able to analyse. As set out above data exists within the computer system which cannot be accessed by every user, or which is not suitable for human analysis. Furthermore, human nature is such that repeatedly performing similar tasks is likely to lead to errors, particularly in situations where large numbers of very similar requests are likely to be received.

In the following disclosure various techniques for controlling access to files are described which are intended to address shortcomings with previous systems. The described file security control system utilises computer-based analysis of language and parameters to determine whether a user's request for access to certain files should be permitted.

Each of the techniques utilises multiple parameters and elements to decide whether a user should be provided access to particular files. The techniques may be triggered by a user request for access, by a request by another user, or by automated systems or processes. In summary, when a user wants access to a file they enter details of the file (for example a document) to which access is required, a natural language explanation of why access is required and the content of the file into a request module of the computing system.

The request module transmits the request and explanation to an analysis module which compares the request with the file and various parameters to determine whether access should be granted. The analysis module performs an analysis of the natural language explanation and the file to determine whether they are sufficiently similar. In particular, the module compares the user's justification for access, which includes what the user thinks the file (in particular a document) contains, against the actual content of the document and the type of the document. The module may also consider whether the actual content (which may be determined by the analysis module) matches the user's summary of what they think is in the document. The analysis module may be implemented using a Large Language Model (LLM), which is particularly trained for the type of analysis to be performed.

The analysis module may also consider a wide range of parameters relating to the user and file when deciding whether to grant access, in addition to the natural language analysis. Based on all aspects analysed the analysis module determines whether a threshold has been reached to permit access. For example, the analysis module may also consider factors such as whether peers of the user have access, and/or who created the file.

The file security control system then modifies permissions for the file accordingly, and may notify the user and/or file owner of the outcome. In particular, if the access is denied the system sends a notification to the user, and optionally the owner of the file, indicating the denial and an explanation why. If the request is approved the user and the file owner are notified. As set out in further detail below, all requests and decisions are logged in an audit system to allow later review. Such audit logs may also be utilised as inputs for later requests to guide an LLMs behaviour in responding to such future requests. The audit log requests could also be reviewed and labelled to be used as further training data.

Prior to describing various techniques in more detail a set of categories of types of information that may be considered by the system are set out to aid the reader's general understanding. The details provided in each category are given by way of example only, and further details will be described below in a non-exhaustive manner.

A first category is the content of the files and the user's request. The natural language content of the request may be analysed using an LLM and compared to the content of the files. This allows a human-like assessment of reasoning for requesting access thereby avoiding a binary decision based solely on a set of yes/no comparisons of parameters.

A second category of information that may be considered is the role of the user (unless otherwise specified, in the following disclosure "user" will generally mean "the user requesting access") or other characteristic of his position or responsibilities within the organization. For example the user's group in the organization may be compared to the group to which the file is related.

A third category of information is metadata associated with the file to which access is being requested. For example that metadata may include specific security provisions, authors names and details, or categories for the content.

A fourth category is technical information relating to users' behaviour and access within the computing system. For example, if the system determines a user has access to closely related files and frequently accesses it, that may be a flag that access should be provided. Similarly, if peers of the user have access to the file, or created it, this may indicate access should be granted.

The system may be configured to provide a weighting to each factor that is considered such that an overall view or score can be obtained for a request. The weight given to each parameter may be configurable to allow priorities to be varied by user, implementation, or even based on the file being considered. For example, files which include customer-related information may place greater weight on whether the user's responsibilities relate to that client, whereas files containing general commercial information may place more emphasis on a person's role (sales or technical).

Use of one or more of the categories of information above may enable access requests to be analysed and decided without requiring the intervention of any users, thereby improving efficiency and also allowing a more comprehensive and accurate consideration to take place that is not possible for a user to conduct. This improved review is not only limited to improving the speed at which a review can be conducted compared to a human user, but also allows implementation of steps that would not be possible for human user. For example, the computing system can consider a user's behaviour with regard to network or file access, and can review a wider range of parameters than is possible for a user. Furthermore machine intelligence can be utilised to improve the accuracy and detail of the review, which may be able to identify patterns and situations which would be missed by a human user.

Typically the current disclosure is for implementation in a networked computing system in which a plurality of computers are networked. Users and files may be widely dispersed, and users requesting access to files may not have any direct relationship to the creator, owner, or manager of the files. It is therefore not possible for the creator, owner, or manager of the files to make a full assessment whether the user should be entitled to access. However, the current disclosure sets out techniques whereby the computing system can obtain sufficient information to be able to make a meaningful assessment.

Figure 2:
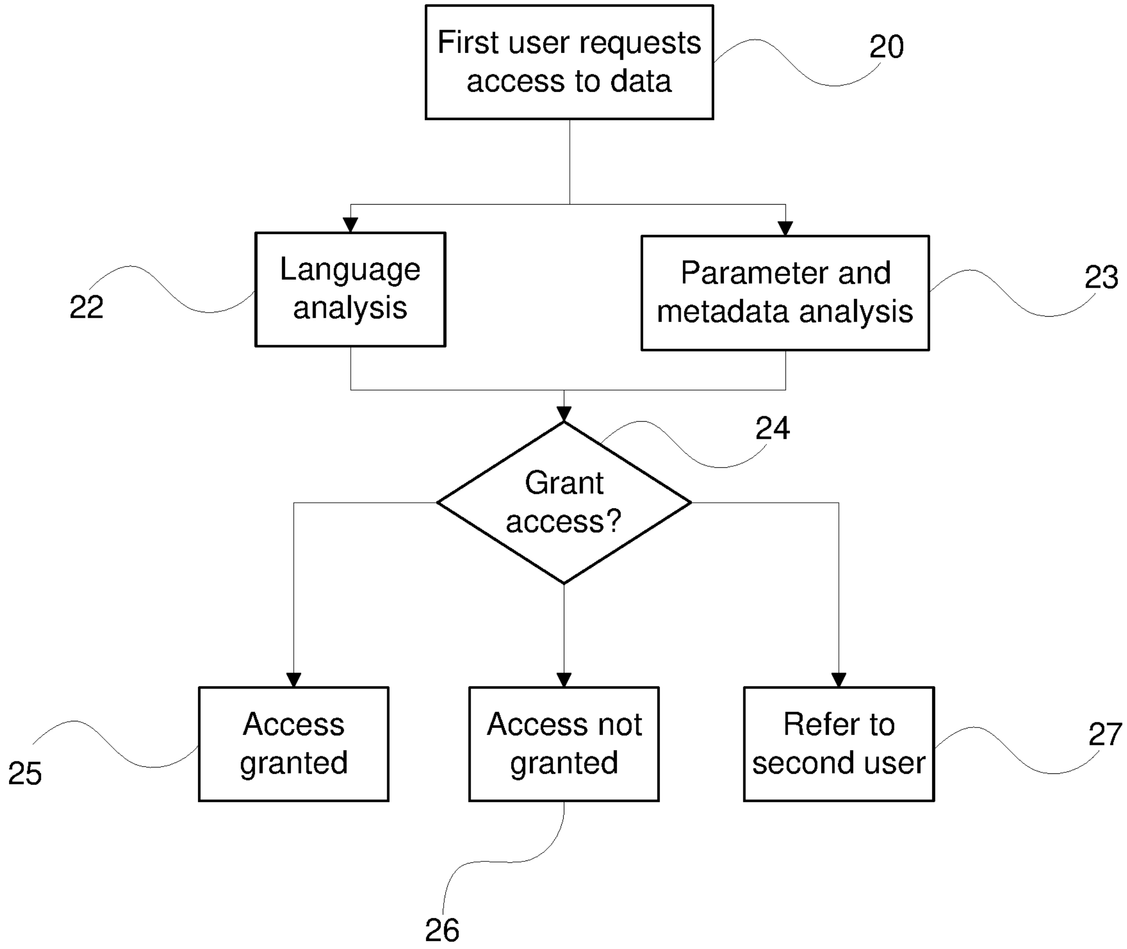
FIG. 2 shows a flow chart of a security control method according to the current disclosure.

FIG. 2 shows a flow chart of computer-implemented security control system which may address the drawbacks associated with the method of FIG. 1. In particular the method of FIG. 2 uses the computing systems access to data and analysis capabilities of the computing system to arrive at a decision in a more efficient manner and while considering a wider range of parameters and details.

At step 20 a first user requests access to a file to which they do not currently have access. The request includes a natural language explanation from the first user why they need access to the file and what the user believes the file contains. For example, if the user is requesting access to a pricing document and is in a sales role they may write "Access required to prepare a pricing proposal for a client because the document contains relevant discount rates."

At step 22 & 23 the security control system begins analysis of the request to determine whether it should be granted, which analysis comprises two general types. At step 22 a language-based analysis of the user's reasons for requiring access and the file to which access is requested is performed, and at step 23 a review of parameters and metadata relating to the user and file is performed. In FIG. 2 these types of analysis are shown in parallel, but they may be performed in any appropriate manner, either in parallel, series, or a mixture. Certain elements of each analysis may overlap or feed results into the other analysis hence a mixed or even iterative execution could be utilised. In certain implementations language and parameter analysis could be considered as a single process conducted by a single entity.

In step 22 a language analysis system, for example a Large Language Model (LLM), is utilised to analyse the content of the user's request and the content of the file to which access is requested. For convenience the term LLM will be used in the description of this process, but as will be appreciated any type of language analysis system could be utilised. Similarly the process is best explained by assuming the file is a document, but the same principles apply to any type of file that can be analysed by an LLM. The LLM may be trained using a set of annotated previous requests and their outcomes. The LLM may also contain knowledge of the relevant security domains and principles, as well as a prompt engineering process to provide the required context and related information to the LLM to take a decision. The annotations may include details of which parameters were considered important in the decision, and/or which elements of the natural language request were considered important.

The LLM analyses the user's explanation for the request and the content of the file to determine at step 24 if it is appropriate for the user to be given access to the file. In relation to the user's request the LLM will analyse aspects such as the user's summary of the information they believe is in the file, details regarding the user's role such as job title or position, their group and responsibilities, and context of the person's position (for example, a low-level assistant, but to a senior finance person). In relation to the document the LLM may analyse the content to determine the topic of the document, the meaning of the information in the document, whether it appears sensitive (e.g. marked as confidential in the text), or any other relevant information that is relevant to whether access should be provided. The LLM may also use information such as its storage location and path to infer details about the content and relevance of the document.

The LLM compares the analysis of the user's reasons for the request and the document content to determine a similarity score for use in determining whether access should be provided. The similarity score is a metric of how similar the user's request is to the content of the document. Thresholds may be set for the similarity score to use it to determine whether access should be provided.

Examples of specific scenarios the analysis may encounter are:— a. A member of the sales department requests access to internal product pricing with a justification that they need to analyse minimum possible sales prices. The LLM may identify that the justification is related to a sales role (pricing) and that the user has a sales position. The LLM may also determine that the document relates to pricing due its content and hence provide access to the user.
b. If the same user requests access to a technical specification document with the same justification, the LLM will determine that the document relates to product specifications which are not related to the justification or the user's role and would decline access.
c. A very junior employee in sales requests access to a document marked as confidential which includes the names of senior executives with a justification relating to sales profits may be declined. Although the content of the document appears relevant the other elements identified by the LLM suggest access is not appropriate (confidentiality, authored by senior people)

The use of the LLM to compare the user's request for access with details of the document allows the system to make an accurate decision on whether to provide access.

Parameter analysis at step 23 provides greater detail and depth to act in conjunction with the LLM analysis. The parameter analysis is utilised to analyse aspects of the request and file which do not need an LLM to analyse, but can be done using more conventional data analysis techniques.

Parameters which may be analysed include the document classification (e.g. public, confidential, commercially sensitive), the user's team compared to the owner of the document, the location of the user, the user's general access permissions in relation to permissions relating to the document, groups of which the user and/or document are members, and peer group memberships in relation to the document ownership. Further details of the types of parameter that may be considered are set out below. When the LLM is called details of previous decisions made by humans may also be included in the prompts to the LLM (a technique often known as Retrieval Augmented Generation). Those previous decisions may be obtained from the audit log, as explained elsewhere, based on the user, the file requested, or any other parameter which may be related to previous requests.

At step 24 the security control system takes a decision whether access should be granted based on the LLM and/or parameter analysis performed at steps 22 and 23. The security control system decides whether to grant access based on an overall score of the various elements considered. Different weights may be applied to different elements depending on which elements are considered most important. For example, for engineering documents the match between the user's justification and document content may be considered more important than the user's level in the organization and given more weight, whereas for a sales document the user's level may be considered more important and given more weight. An overall score is thus formed and compared to a threshold determined for the system, which may be standard or may be dependent on aspects of the user or file.

Certain parameters may be configured in a binary fashion such that if they have a certain value access will not be provided irrespective of any other assessment. For example, access to documents classified as relating to legal matters may only be accessed by members of the legal group.

The score used to decide whether to grant access can be calculated in various ways. For example an absolute value could be utilised such that the total of the weighted assessments has to exceed a certain value to be approved. Alternatively a confidence score could be utilised to express how certain the system is that access should be provided. For example, this could be expressed a percentage with 100% representing a very clear decision to provide access and 0% a very clear decision not to. The system would be configured with a threshold above which access would be provided, which threshold may be configurable.

The security control system can take various decisions in relation to the user's request. Access may be granted at step 25 and a notification sent to the user. Access may be provided by the security control system updating permissions for the file directly, or by sending commands to the file storage system to make appropriate updates. The notification may include the LLM's reasons for granting the access, and may also be sent to the owner of the document.

The security control system may decide the user is not permitted access in which case at step 26 a notification is sent to the user, they are not provided with access, and the document's owner may be notified of the failed request. The owner and/or user may be notified of the reasons for the LLM's decision. Alternatively at step 27 the security control system may consider the correct outcome is not clear and the request is referred to a second user, for example the document's owner, for a decision in which case the first and second users are notified and access is not provided. A user's input may be required for particularly sensitive documents, based on a user's characteristics or parameters, or where the overall outcome from all weighted aspects is too closely balanced to be able to decide automatically. The threshold for allowing an automatic decision may be configured based on details of the user requesting access, or the document to which access is being requested. When a request is referred to a user to decide the outcome of the user's decision is stored in the audit log and may be utilised by the LLM when considering future similar requests.

The process described with reference to FIG. 2 therefore allows a decision to be taken by the computing system regarding a file access request by a user. The decision is taken based on an analysis of the content of the request and the file, and other parameters. The analysis and decision is performed without any user intervention allowing an improvement in the speed, accuracy, and scope of the parameters considered when taking the decision. Only where the analysis reveals a need for a user to take a decision is human intervention required. The user's efforts are thus reduced and focused on the more difficult decisions.

Figure 3:
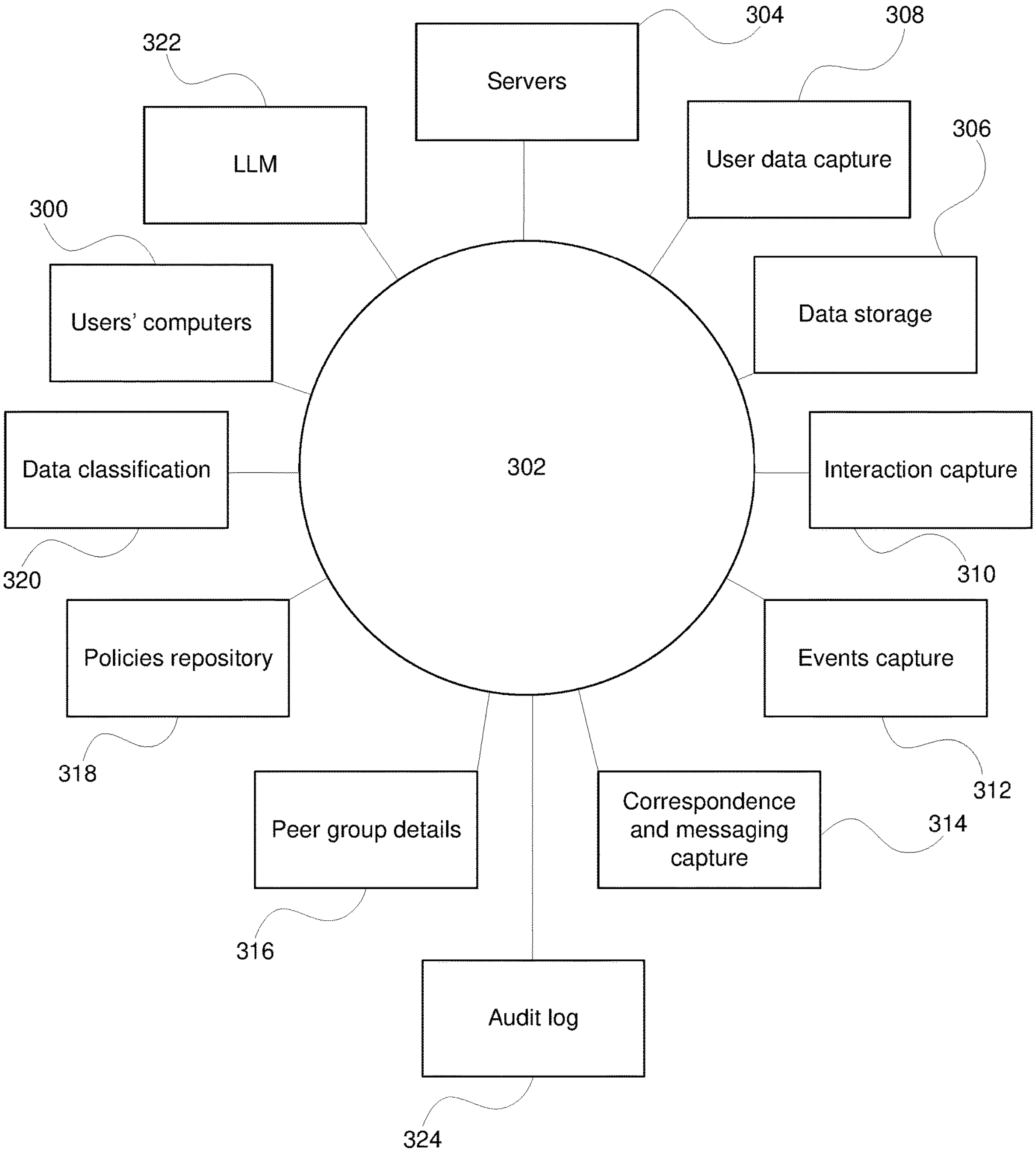
FIG. 3 shows an exemplary set of modules and systems for implementation of the current disclosure.

Further details of the system and implementation of the method of FIG. 2 will now be discussed. FIG. 3 shows an exemplary overview diagram of hardware, computer-implemented elements, and functions of the computing system in which the system may be implemented. In general the computing system will comprise a plurality of user's computers 300 connected via a network 302 with a plurality of servers 304. The network 302 enables sharing of files and instructions between the user's computers 300 and the servers 304. As set out below the user's computers 300 and servers 304 provide a range of functionalities to enable implementation of the security control system. The separation of functionalities shown in FIG. 3 is purely for ease of explanation and there is no limitation to how those functionalities are divided between software and hardware entities. Each function may be provided by a separate hardware or software system, or may be split across multiple such systems.

File storage module 306 represents the storage of files to which user's may require and request access. File storage module 306 may represent any storage type of a computing system. For example, files may be stored on a user's computer, on network attached storage, dedicated file servers and document management systems, or networked file management systems and cloud-based storage systems. As noted above, any type of file may be stored, but will principally comprise documents. Metadata and parameters defining the files may be stored to provide additional information on each file or document. The file storage system may also store information regarding access rights which are updated by the security control system (or other process), or those access rights may be stored separately. In addition the storage location and path may be used to identify further information about the document.

User data capture module 308 captures and stores information regarding users who have access to the system, such as organizational information, titles, departments and reporting lines, and group memberships. The data may be used to build a structure tree of users. The system may capture such data from routine scanning of personnel management systems, directory systems (Active Directory/Azure Active Directory), or from manual entry. The user data information allows identification of a user's teams and related people which may be useful in determining whether files are relevant to them and they should be provided access.

The interaction capture module 310 gathers information regarding which users are interacting with other users within the computing system. This may primarily be gathered from ticketing and workflow management systems, but also from communication systems. Interaction data enables the security control system to infer the relevance of files to a user based on the access provided to other users they are interacting with.

The events capture module 312 captures interactions of users and files within the computing system. For example, the module may log all access to files by each user which enables identification of groups of files to which certain users may require access. For example if the module determines that users often access a set of documents {a, b, c, d, e} but the requesting user only has access to {a, b, c, d} a request for access to {e} may be implied to be reasonable and allowed. Similarly, in conjunction with the interaction and peer module it may be determined that the requesting user has strong interactions with another user who has permission to access {e}. This may indicate access should be granted. The events capture module may also monitor user's behaviour in a more general sense. For example, if there is a sudden increase in the number of requests, the person's position in the organization has changed, or they have stated they are leaving, may all affect the decision whether to provide access. It is unusual for a user tasked with reviewing access requests to be aware of such changes. Dynamic events may be particularly relevant to deciding whether to grant access as they imply something has changed. That change may support (for example a user moving to a different team and therefore requiring access to different document) a request for a access, or guide against it (a user has indicted they are leaving).

The messaging capture module 314 analyses communications between users, for example email and instant messages, in order to determine relationships and interactions between users which may provide an indication of whether a user requires access to particular files. For example this analysis may reveal correspondence between a user who already has access to a file and a user who has requested access to that file which implies access should be allowed. A language analysis system may also be utilised to analyse communications in order to determine their meaning and content which may provide additional guidance on whether a user requires access to files.

The peer group module 316 utilises any aspect of the computing system to determine a user's peer group which may provide additional information on whether a user requires access to files. The user's peer group may be determined based on groups setup within the communication system, the user's position within the organizations structure, and other modules within the system. For example, the communication analysis module may also reveal information about a user's peer group. A user's peer group may be dynamic and evolve over time as the user works with different teams or on different projects.

A policies module 318 stores configuration information regarding the review and grant of access requests. Policies may include details of which types of file can be approved automatically by the system, which types always require user input, and weighting and thresholds of the different parameters. Configurations may be the same for a whole organization or may also be defined on a user, group, or other basis. For example, the system behaviour may be depend on the security level allocated to files and on the level of the user requesting access.

File classification module 320 classifies file based on its sensitivity, confidentiality, or other aspect of the content. The classification may be applied manually by users during document creation or at another stage in the document's life, or may be applied automatically by a Data Classification Engine (DCE) which determines the classification based on, for example, document content, context, and/or user information.

Each of the modules discussed herein which gather information on users and the system may operate on a continuous basis, or run on a schedule, to maintain a current view of the relevant parameters. This ensures that requests are considered against the current circumstances thus maximising accuracy.

As discussed above the LLM module 322 analyses the content of files (particularly documents) and a user's justification for requesting access to understand their content, the context, and meaning. The LLM also has access to all other and information discussed herein to utilise in its analysis. The output of the analysis is used to compare the justification and files to determine whether the user should be provided with access. The LLM may analyse the actual content of the file as well as the user's view of the file's content which may indicate whether the user's expectations match reality, or if they are attempting to gain access to files by misrepresentation (accidental or otherwise). The LLM may be trained based on example requests and documents, as well as the outcome of the decision whether to provide access. As outlined above the LLM will also be provided with relevant knowledge of the security systems and domains applicable to each installation.

The LLM may be termed a "fine-tuned" LLM since it has been trained for the specific tasks performed by the security control system. The LLM may be trained on previous requests which have been labelled appropriately for use in training or fine-tuning. The aim of the training process is to understand what a human user would do in a particular situation and train the LLM to take the same decisions. These principles apply to all aspects of the decision process and file which is considered in that process. As noted below, when a human user assists in a decision they may provide a natural language explanation which can be used to train the LLM. These previous decisions may be used in the prompts passed to the LLM for future requests.

Audit log module 324 receives and stores information on each process conducted by the system to allow later auditing, and also for use by the security control system when considering future requests. Each user request is logged together with details of the outcome of the request. The amount of detail stored in the log may be configurable to only store high-level details of the request and outcome, or the specific inputs, outputs and reasons may be stored. The latter more detailed storage has the benefit of enabling the decisions to be used to train the system for future requests and provide more information on which to base future similar requests. The audit log may be stored in a format which works efficiently with LLMs, for example a Vector db structure. For example, when a specific document is requested by a user the system may review the audit log 324 for previous decisions relating to that document to guide how to decide the new request. This may be particularly helpful, for example, if the same user requests a document to which they have previously been declined access. When a request is referred to a human user for a decision the user may enter a natural language explanation of the reasons for their decision. That natural language explanation may be utilised by the analysis system when taking future decisions.

Figure 4:
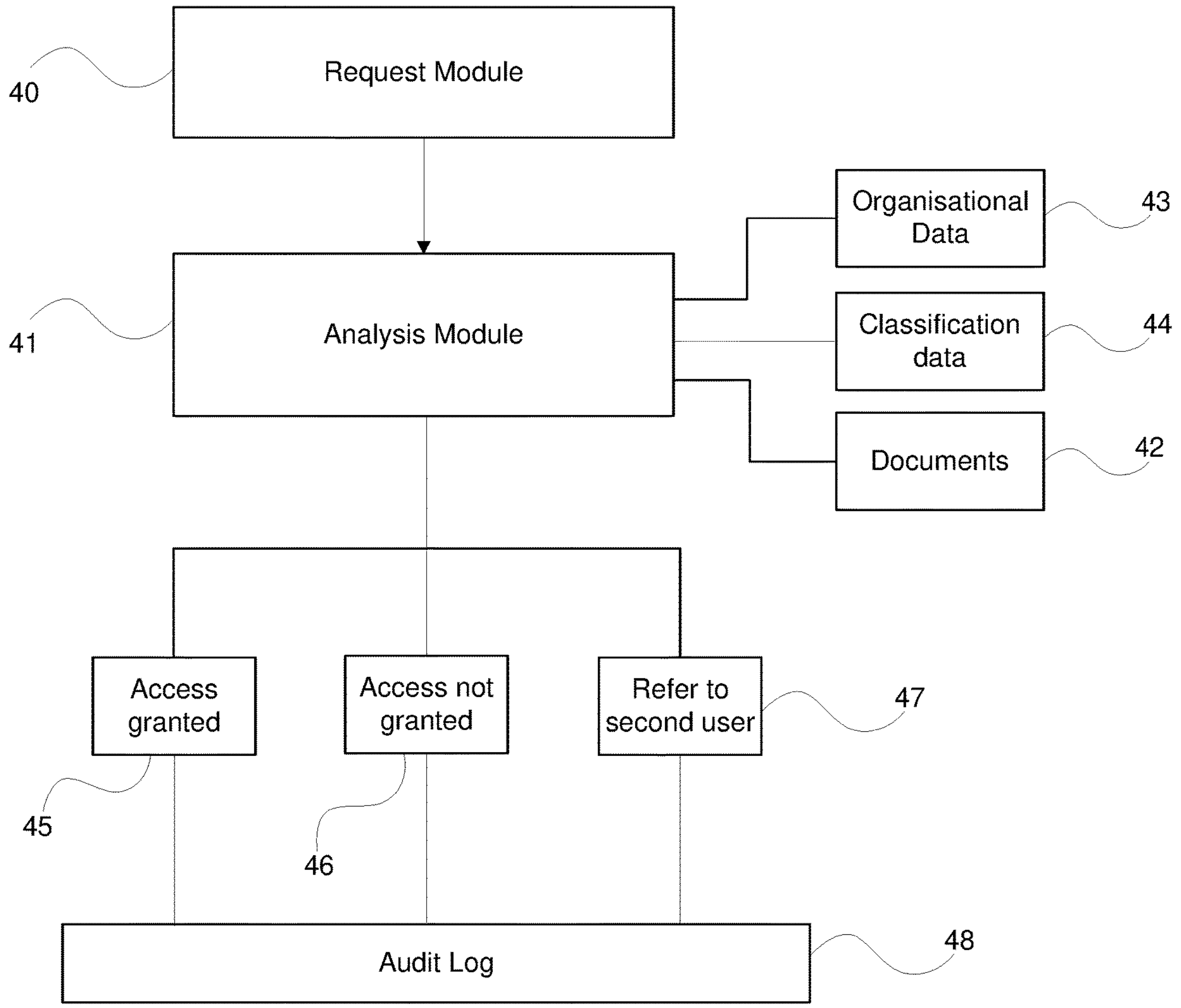
FIG. 4 shows modules and illustrative implementation of the current disclosure.

FIG. 4 shows an overview of how selected elements of FIGS. 2 and 3 interact during the processing of a user's request for access to a file. The process starts at block 40 in which a request module receives a user request for access to a file, which request includes a natural language description of their reasons for requesting access to the file, and the user's summary of the content of the document.

Block 41 represents an analysis module which performs the analysis of the document, the user's request, and other parameters to determine whether access should be allowed. The module 41 may calculate a similarity score between the document 42 and the user's justification which is compared to a configured threshold to determine whether access should be allowed. The block 41 also takes input from the modules discussed above with reference to FIG. 3, for example organizational data 43 from directory systems, and/or document classifications 44 from a classification store.

Based on the analysis in block 41, and comparison of scores and parameters, the module 41 determines whether access should be granted 45, denied 46, or referred to a second user for human review 47. Any or all aspects of the process may be stored into an audit log 48 such that a record is kept of decisions taken by the system, and of the parameters behind that decision.

Set out below is an overview of a specific process using a exemplary set of the principles discussed hereinbefore, followed by a set of examples of specific situations. These processes and examples are for illustrative use only, and are not intended to restrict the parameters considered, nor to specify the outcomes will always be as described.

A fine-tuned generative AI model is created by training a foundation model with a large set of examples created by a human. The training requests situations are captured in documents describing the request, expected outcomes and justifications. Specific details which may be in the documents are:— a. User justification for being granted access.
b. User data—title, time in the organization, user's past behaviour.
c. Peer data—peer group, do peers have access have to the document.
d. File data—content, metadata such as time of creation, who created it, their title and details, other people with access to the document, and past access history.
e. Past requests for the document, decisions, and in particular decisions by humans.
f. The weighting of different parameters to be considered.

Example 1

User Justification: "Need to review and update project details."

User Data:

Title: Project Manager

Time in Organization: 5 years

Past Behaviour: Has accessed similar project files in the past

Peers Data: Other project managers frequently access similar files

File Data:

Content: The document contains details about the project's objectives, timelines, and team members. It also includes a section on risks and mitigation strategies.

Metadata: Created by a user in the same department, accessed by other project managers.

Past Requests and Decisions: Similar requests by the user for related files have been approved in the past Weights: High weight on user role and past behaviour, medium weight on peer behaviour and file relevance Output: Request approved. The user's role, past behaviour with similar files, and the relevance of the file content to his current project were key factors in the decision.

Example 2—Request not Approved

User Justification: "Analyzing financial trends for a report."
User Data:
Title: Intern
Time in Organization: 2 weeks
Past Behavior: No previous access to similar confidential files
Peers Data: No other interns have requested access to this file
File Data:
Content: The document contains sensitive financial data including revenue forecasts, cost projections, and strategic financial plans.
Metadata: Created by the CFO, not accessed by other interns
Past Requests and Decisions: No similar requests by the user or other interns have been approved in the past
Weights: High weight on user role and file sensitivity, low weight on user justification
Output: Request not approved. The sensitivity of the file content, the user's role, and the lack of previous similar accesses were key factors in the decision.

Example 3

User Justification: "Need access to ProductRoadmap.docx for a special project assigned by the Head of Product."
User Data:
Title: Junior Product Manager
Time in Organization: 1 year
Past Behaviour: Has accessed similar product-related files but not high-level strategic ones
Peers Data: Other junior product managers have not requested access to this file
File Data:
Content: The document contains future product plans, including features to be developed, market analysis, and competitive landscape.
Metadata: Created by the Head of Product, accessed only by senior product management team members
Past Requests and Decisions: No similar requests have been made in the past
Weights: High weight on user role and file sensitivity, medium weight on user justification
Output: Decision deferred to human approver due to the sensitivity of the file content and the user's role. The user's justification seems plausible as they are part of the product team and working on a special project. However, the file is typically accessed only by senior team members, making it a borderline case. A human approver can consider additional context or request more information to make a decision.

Example 4

User Justification: "Need access to ProductRoadmap.docx for a special project assigned by the Head of Product."
User Data:
Title: Junior Product Manager
Time in Organization: 1 year
Past Behavior: Has accessed similar product-related files but not high-level strategic ones
Peers Data: Other junior product managers have not requested access to this file
File Data:
Content: The document contains future product plans, including features to be developed, market analysis, and competitive landscape.
Metadata: Created by the Head of Product, accessed only by senior product management team members.
Past Requests and Decisions: No similar requests have been made in the past
Past Requests Decisions from Human Approver: A similar request was made by another Junior Product Manager for a special project. The human approver granted access after verifying the details of the special project with the Head of Product.
Weights: High weight on user role and file sensitivity, medium weight on user justification, high weight on past decisions from human approver
Output: Request approved. The user's role, the relevance of the special project, and the precedent set by the human approver's past decision were key factors in the decision. The AI model learned from the past decision of the human approver that junior product managers can be granted access to such files for special projects after proper verification.

The present disclosure has been given by reference to files to ensure a clear description, but as will be apparent the techniques may be applied to any type of object present in a computer system. For example, content of a CRM system, web pages, notebooks, or any equivalent object. Although all requests will include a natural-language justification and explanation of what the user is expecting the object to contain, those will be made relevant to the type of object. For example, in the case of an access request for data in a CRM system the explanation may relate to the purpose of needing the data and what type of people are expecting to be identified.

Figure 5:
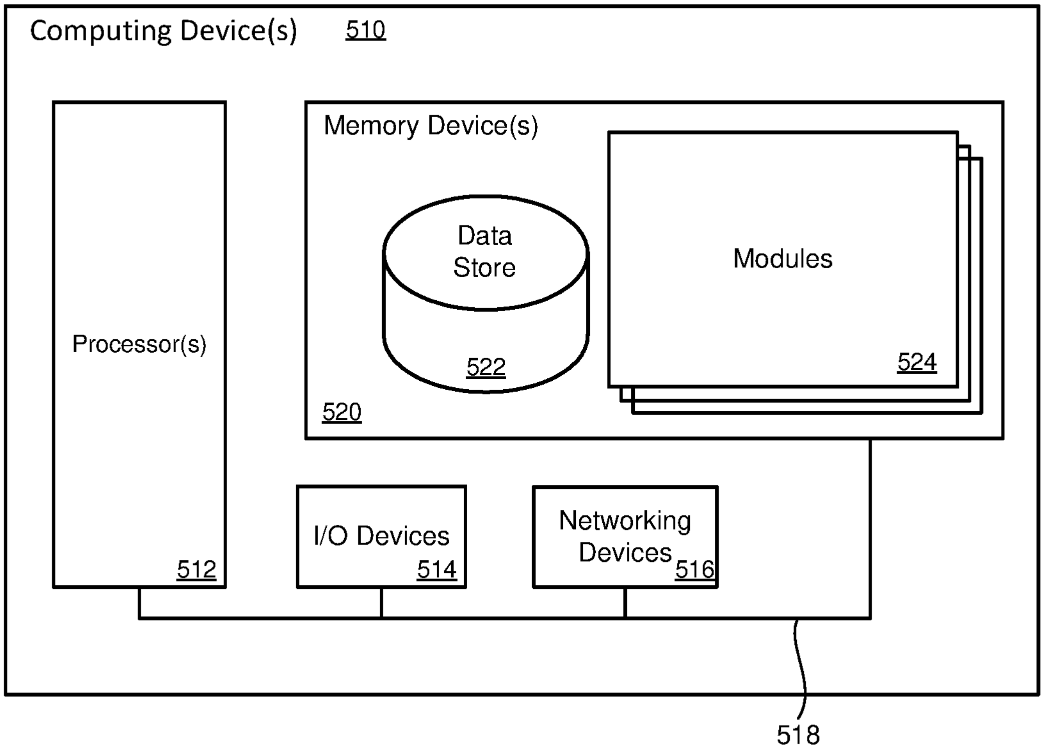
FIG. 5 shows an example of a computing device according to the current disclosure.

FIG. 5 illustrates a computing device 510 on which modules of this technology may execute. A computing device 510 is illustrated on which a high level example of the technology may be executed. The computing device 510 may include one or more processors 512 that are in communication with memory devices 520. The computing device 510 may include a local communication interface 518 for the components in the computing device. For example, the local communication interface 518 may be a local data bus and/or any related address or control busses as may be desired.

The memory device 520 may contain modules 524 that are executable by the processor(s) 512 and data for the modules 524. In one aspect, the memory device 520 may include a checkpoint manager, a migration management module, and other modules. In another aspect, the memory device 520 may include a network connect module and other modules. The modules 524 may execute the functions described earlier. A data store 522 may also be located in the memory device 520 for storing data related to the modules 524 and other applications along with an operating system that is executable by the processor(s) 512.

Other applications may also be stored in the memory device 520 and may be executable by the processor(s) 512. Components or modules discussed in this description that may be implemented in the form of software using high-level programming languages that are compiled, interpreted or executed using a hybrid of the methods.

The computing device may also have access to I/O (input/output) devices 514 that are usable by the computing devices. Networking devices 516 and similar communication devices may be included in the computing device. The networking devices 516 may be wired or wireless networking devices that connect to the internet, a LAN, WAN, or other computing network.

The components or modules that are shown as being stored in the memory device 520 may be executed by the processor(s) 512. The term "executable" may mean a program file that is in a form that may be executed by a processor 512. For example, a program in a higher level language may be compiled into machine code in a format that may be loaded into a random access portion of the memory device 520 and executed by the processor 512, or source code may be loaded by another executable program and interpreted to generate instructions in a random access portion of the memory to be executed by a processor. The executable program may be stored in any portion or component of the memory device 520. For example, the memory device 520 may be random access memory (RAM), read only memory (ROM), flash memory, a solid state drive, memory card, a hard drive, optical disk, floppy disk, magnetic tape, or any other memory components.

The processor 512 may represent multiple processors and the memory device 520 may represent multiple memory units that operate in parallel to the processing circuits. This may provide parallel processing channels for the processes and data in the system. The local interface 518 may be used as a network to facilitate communication between any of the multiple processors and multiple memories. The local interface 518 may use additional systems designed for coordinating communication such as load balancing, bulk data transfer and similar systems.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term "comprising" or "including" does not exclude the presence of other elements. Similarly the use of the singular does not exclude the plural and vice-versa.

The term "computer" or "computing device" is used herein to refer to any computing device which can execute software and provide input and output to and from a user. For example, the term computer explicitly includes desktop computers, laptops, terminals, mobile devices, and tablets, as well as any similar or comparable devices. There is no intended difference between the terms computer, computing system or computing device, all of which fall within the same definition of computer.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable storage media or, more generally, a computer program product. The computer readable storage media, as the term is used herein, is not to be construed as storage in the form of transitory signals per se, such as radio waves or other freely propagating electromagnetic waves. The one or more computer readable storage media could be, for example, an electronic, magnetic, optical, electromagnetic, infrared, or semiconductor system, or a propagation medium for data transmission, for example for downloading the code over the Internet. Alternatively, the one or more computer readable storage media could take the form of one or more physical computer readable media such as semiconductor or solid state memory, magnetic tape, a removable computer diskette, a random access memory (RAM), a read-only memory (ROM), a rigid magnetic disc, and an optical disk.

A selection of examples is set out in the following numbered clauses.

1. A computer system for a security control, comprising: one or more computer readable storage media storing program instruction and one or more processors which, in response to executing the program instructions, are configured to: receive user input requesting access to an object of the computing system, wherein the user input identifies the object and includes a natural language justification for requesting access; perform a language analysis of the natural language justification and the object to identify a similarity score between the natural language justification and the object; determine whether access should be granted to the object based at least in part on the similarity score; and configure permissions for the object to enable access by a user when a determination is made to grant access.
2. A computer system according to clause 1, wherein the natural language justification comprises a description of what the user believes to be the content of the object.
3. A computer system according to clause 1 or 2, wherein the similarity score is based at least in part on a comparison of a user description and actual content of the object.
4. A computer system according to any preceding clause, wherein the program instructions are further configured to cause the one or more processors to receive metadata associated with the object, wherein the determination whether access should be granted is based at least in part on the metadata.
5. A computer system according to any preceding clause, wherein the determination whether access should be granted is based at least in part on whether users related to the user have access to the object.
6. A computer system according to clause 5, wherein the users are related by being in a common group in a directory server.
7. A computer system according to clause 5, wherein relations between the users are determined based at least in part on communications between the users.
8. A computer system according to any of clauses 5 to 7, wherein the relations between the users are determined based at least in part on organization data of an organization to which the users belong.
9. A computer system according to any of clauses 5 to 8, wherein the relations between the users are determined based at least in part on interactions in workflow management systems.
10. A computer system according to clause 5, wherein the related users are based on access to the same files by the requesting user and other users.
11. A computer system according to any preceding clause, wherein the determination whether access should be granted is based at least in part on the user's access rights in relation to related objects.
12. A computer system according to any preceding clause, wherein the determination whether access should be granted is based at least in part on the user's role in the organization to which the object belongs.

13. A computer system according to any preceding clause, wherein the determination whether access should be granted is based at least in part on a weighted score of a plurality of parameters including the similarity score.

14. A computer system according to clause 13, wherein the score weightings are dependent on the object and/or user.

15. A computer system according to any preceding clause, wherein the determination is based at least in part on previous network and object access by the user.

16. A computer system according to any preceding clause, wherein when a determination is made to not grant access, sending, by the processor, a notification to a user responsible for the object to take a decision.

17. A computer system according to any preceding clause, wherein the user input and decision are written to an audit log.

18. A computer system according to any preceding clause, wherein the determination is based at least in part on security settings of the object.

19. A computer system according to any preceding clause, wherein the determination is based at least in part on a classification of the object, as determined by a classification engine.

20. A computer system according to clause 19, wherein the classification is based on the sensitivity or content of the data.

21. A computer system according to any preceding clause, wherein the determination is based at least in part on a creator or owner of the object.

22. A computer system according to any preceding clause, wherein information on which the determination is based is captured by the computer system and stored in at least one database for access by the computer system.

23. A computer system according to any preceding clause, wherein the information on which the determination is based is maintained on a continuous or intermittent basis by the computer system.

24. A computer system according to any preceding clause 1, wherein the language analysis is performed by a Large Language Model (LLM).

25. A computer system according to clause 24, wherein the LLM is trained on prior human decisions in relation to user requests.

26. A computer system according to clause 24 or 25, wherein the LLM is fine-tuned using a subset of annotated human decisions in relation to user requests.

27. A computer system according to any of clauses 24 to 26, wherein details of prior requests related to the current request are provided as an input to the LLM.

28. A computer system according to any preceding clause, wherein the program instructions are further configured to cause the one or more processors to transmit a notification to the user indicating whether access has been granted.

29. A computer system according to any preceding clause, wherein the object is a file stored in the computer system.

30. A computer system according to any preceding clause, wherein the object at least partly represents human-readable text.

31. A computer-implemented method for object security control, comprising: receiving, by a processor, user input requesting access to an object stored in a computer system, wherein the user input identifies the object and includes a natural language justification for requesting access; and performing, by the processor, a language analysis of the natural language justification and the object to determine whether to grant access to the object.

32. A computer-implemented method according to clause 31, wherein the natural language justification comprises a description of what the user believes to be the content of the object.

33. A computer-implemented method according to clause 31 or 32, wherein the object is a file stored in the computing system.

34. A computer-implemented method according to clause 31 or 32, wherein the object at least partly represents human-readable text.

35. A computer-implemented method for object security control, comprising: receiving, by a processor, a request comprising the identity of a user requesting access to an object, an identity of the object, and a natural language justification for requesting access; performing, by the processor, a language analysis of the natural language justification and the object to identify a similarity score between the natural language justification and the object; determining, by the processor, whether access should be granted to the object based at least in part on the similarity score; and configuring, by the processor, permissions for the object to enable access by the user when a determination is made to grant access.

36. A computer-implemented method according to clause 35, wherein the natural language justification comprises a description of what the user believes to be the content of the object.

37. A computer-implemented method according to clause 36, wherein the similarity score is based at least in part on a comparison of the user's description and the content of the object.

38. A computer-implemented method according to any of clauses 35 to 37, further comprising receiving metadata associated with the object, wherein the determination whether access should be granted is based at least in part on that metadata.

39. A computer-implemented method according to any of clauses 35 to 38, wherein the determination whether access should be granted is based at least in part on whether users related to the user have access to the object.

40. A computer-implemented method according to clause 39, wherein the users are related by being in a common group in a directory server.

41. A computer-implemented method according to clause 39, wherein relations between the users are determined based at least in part on communications between the users.

42. A computer-implemented method according to any of clauses 39 to 41, wherein relations between the users are determined based at least in part on organization data of an organization to which the users belong.

43. A computer-implemented method according to any of clauses 39 to 42, wherein relations between the users are determined based at least in part on interactions in workflow management systems.

44. A computer-implemented method according to clause 39, wherein related users are based on access to the same objects by the user and other users.

45. A computer-implemented method according to any of clauses 35 to 44, wherein the determination whether access should be granted is based at least in part on the user's access rights in relation to related objects.

46. A computer-implemented method according to any of clauses 35 to 44, wherein the determination whether access should be granted is based at least in part on the user's role in an organization to which the object belongs.

47. A computer-implemented method according to any of clauses 35 to 46, wherein the determination whether access should be granted is based at least in part on a weighted score of a plurality of parameters including the similarity score.

48. A computer-implemented method according to clause 47, wherein the score weightings are dependent on the object and/or user.

49. A computer-implemented method according to any of clause 35 to 48, wherein the determination is based at least in part on previous network and object access by the user.

50. A computer-implemented method according to any of clauses 35 to 49, wherein when a determination is made to not grant access, transmitting, by the processor, a notification to a user responsible for the object to take a decision.

51. A computer-implemented method according to any of clauses 35 to 50, wherein the user input and decision are written to an audit log.

52. A computer-implemented method according to any of clauses 35 to 50, wherein the determination is based at least in part on security settings of the object.

53. A computer-implemented method according to any of clauses 35 to 50, wherein the determination is based at least in part on a classification of the object, as determined by a classification engine.

54. A computer-implemented method according to clause 53, wherein the classification is based on the sensitivity or content of the data.

55. A computer-implemented method according to any of clauses 35 to 54, wherein the determination is based at least in part on a creator or owner of the object.

56. A computer-implemented method according to any of clauses 35 to 55, wherein information on which the determination is based is captured by the computer system and stored in at least one database for access by the computer system.

57. A computer-implemented method according to any of clauses 35 to 56, wherein information on which the determination is based is maintained on a continuous or intermittent basis by the computer system.

58. A computer-implemented method according to any of clauses 35 to 57, wherein the language analysis is performed by a Large Language Model (LLM).

59. A computer-implemented method according to clause 58, wherein the LLM is trained on prior human decisions in relation to user requests.

60. A computer-implemented method according to clause 58 or 59, wherein the LLM is fine-tuned using a subset of annotated human decisions in relation to user requests.

61. A computer-implemented method according to any of clauses 58 to 60, wherein details of prior requests related to the current request are provided as an input to the LLM.

62. A computer-implemented method according to any of clauses 35 to 61, further comprising transmitting a notification to the user indicating whether access has been granted.

63. A computer-implemented method according to any of clauses 35 to 62, wherein the object is a file stored in the computer system.

64. A computer-implemented method according to any of clauses 35 to 63, wherein the object at least partly represents human-readable text.

The invention claimed is:

1. A computer system for a security control, comprising:

one or more computer readable storage media storing program instruction and one or more processors which, in response to executing the program instructions, are configured to:

receive user input requesting access to a file of the computing system, wherein the user input identifies the file and includes a natural language justification of why access is desired and a user description of content of the file for requesting access;

perform a language analysis of the natural language justification and the file to identify a similarity score between the natural language justification based at least in part on why access is desired and the file, and a comparison of the user description and actual content of the file;

determine whether access should be granted to the file based at least in part on the similarity score; and configure permissions for the file to enable access by a user when a determination is made to grant access.

2. A computer system according to claim 1, wherein the program instructions are further configured to cause the one or more processors to receive metadata associated with the file, wherein a determination whether access should be granted is based at least in part on the metadata.

3. A computer system according to claim 1, wherein the determination whether access should be granted is based at least in part on whether users related to the user have access to the file.

4. A computer system according to claim 3, wherein the users are related by being in a common group in a directory server.

5. A computer system according to claim 3, wherein relations between the users are determined based at least in part on communications between the users.

6. A computer system according to claim 3, wherein the relations between the users are determined based at least in part on organization data of an organization to which the users belong.

7. A computer system according to claim 3, wherein the relations between the users are determined based at least in part on interactions in workflow management systems.

8. A computer system according to claim 3, wherein the related users are based on access to the same files by the requesting user and other users.

9. A computer system according to claim 1, wherein the determination whether access should be granted is based at least in part on the user's access rights in relation to related files, the user's role in the organization to which the file belongs and/or a weighted score of a plurality of parameters including the similarity score.

10. A computer system according to claim 1, wherein the determination whether access should be granted is based at least in part on a weighted score of a plurality of parameters including the similarity score, wherein the score weightings are dependent on the file and/or user.

11. A computer system according to claim 1, wherein the determination is based at least in part on previous network and object access by the user.

12. A computer system according to claim 1, wherein when a determination is made to not grant access, sending, by the processor, a notification to a user responsible for the file to take a decision.

13. A computer system according to claim 1, wherein the determination is based at least in part on a classification of the file, as determined by a classification engine.

14. A computer system according to claim 1, wherein the determination is based at least in part on a creator or owner of the file.

15. A computer system according to claim 1, wherein the language analysis is performed by a Large Language Model (LLM), which may optionally be trained on prior human decisions in relation to user requests.

16. A computer system according to claim 15, wherein the LLM is fine-tuned using a subset of annotated human decisions in relation to user requests.

17. A computer system according to claim 15, wherein details of prior requests related to the current request are provided as an input to the LLM.

18. A computer system according to claim 1, wherein the file represents readable text.

* * * * *